United States Patent
Li et al.

(10) Patent No.: US 12,139,647 B2
(45) Date of Patent: Nov. 12, 2024

(54) EPOXY PHOSPHATE ESTER

(71) Applicants: Dow Global Technologies LLC, Midland, MI (US); Rohm and Haas Company, Collegeville, PA (US)

(72) Inventors: Tuoqi Li, Dallas, TX (US); Joseph J. Zupancic, Glen Ellyn, IL (US); Yinzhong Guo, Pearland, TX (US); Jie Wu, Lake Jackson, TX (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 127 days.

(21) Appl. No.: 17/999,005

(22) PCT Filed: Apr. 23, 2021

(86) PCT No.: PCT/US2021/028753
§ 371 (c)(1),
(2) Date: Nov. 16, 2022

(87) PCT Pub. No.: WO2021/247161
PCT Pub. Date: Dec. 9, 2021

(65) Prior Publication Data
US 2023/0174835 A1    Jun. 8, 2023

Related U.S. Application Data

(60) Provisional application No. 63/035,008, filed on Jun. 5, 2020.

(51) Int. Cl.
*C09J 167/00* (2006.01)
*C08G 18/58* (2006.01)
*C08K 3/32* (2006.01)

(52) U.S. Cl.
CPC .......... *C09J 167/00* (2013.01); *C08G 18/587* (2013.01); *C08K 3/32* (2013.01); *C08K 2003/329* (2013.01); *C09J 2475/00* (2013.01)

(58) Field of Classification Search
CPC ..... C09J 167/00; C09J 2475/00; C08G 18/12; C08G 18/587; B32B 7/12

USPC ...................................................... 156/331.7
See application file for complete search history.

(56) References Cited

U.S. PATENT DOCUMENTS

| | | |
|---|---|---|
| 4,613,661 A | 9/1986 | Anger et al. |
| 6,184,284 B1 | 2/2001 | Stokich, Jr. et al. |
| 6,458,874 B1 | 10/2002 | Newton |
| 6,893,680 B2 | 5/2005 | Newton |
| 9,637,868 B2 | 5/2017 | Nordberg et al. |
| 9,751,977 B2 | 9/2017 | Zupancic et al. |
| 10,155,890 B2 | 12/2018 | Vietti et al. |
| 2013/0292054 A1 | 11/2013 | Curet |
| 2017/0226391 A1 | 8/2017 | Vietti et al. |
| 2017/0306200 A1* | 10/2017 | Zupancic ............. C08K 5/52 |
| 2020/0199423 A1* | 6/2020 | Li ...................... B32B 15/09 |

FOREIGN PATENT DOCUMENTS

| | | |
|---|---|---|
| JP | 2004035596 A | 2/2004 |
| WO | 2016077355 A1 | 5/2016 |
| WO | 2018049672 A1 | 3/2018 |
| WO | 2018226320 A1 | 12/2018 |

OTHER PUBLICATIONS

PCT/US2021/028753, International Search Report and Written Opinion with a mailing date of Aug. 4, 2021.
PCT/US2021/028753, International Preliminary Report on Patentability with a mailing date of Dec. 6, 2022.

* cited by examiner

*Primary Examiner* — James D Sells
(74) *Attorney, Agent, or Firm* — Boyle Fredrickson, S.C.

(57) ABSTRACT

Provided is a composition comprising one or more epoxy phosphate esters wherein the structure comprises two or more polyester linkages. Also provided is a method of making the epoxy phosphate esters that comprises reacting one or more epoxy-terminated polyesters with one or more phosphoric acids. Further provided is an adhesive composition that comprises one or more epoxy phosphate esters, one or more multifunctional isocyanate prepolymers, and one or more multifunctional isocyanate-reactive compounds.

13 Claims, No Drawings

EPOXY PHOSPHATE ESTER

Laminating adhesives are broadly used, for example in producing flexible laminates for various types of packages and for industrial laminations. Solventless laminating adhesives have advantages over both solvent-borne and water-borne laminating adhesives; those advantages include, for example, improvements to the laminating process, including, for example, reduced energy consumption, reduced operational cost, and improved compliance with environmental, health, and safety standards. In the past, solventless laminating adhesives have typically shown some performance disadvantages. For example, solventless laminating adhesives typically have not been as good as solvent-borne and/or water-borne laminating adhesives in one or more of the following performance criteria, especially when metal laminated structures were tested: boil-in-bag performance, chemical aging performance, retort performance.

In the past, adhesion promoting compounds were added to solventless laminating adhesives. Adhesion promoting compounds included, for example, epoxy resins, silane compounds, carboxylic acids, functional materials, phosphoric acids, and phosphate esters. In some cases, the adhesion promoting compound appeared to improve the performance of the laminate, but the adhesion promoting compound also shortened the pot life of the adhesive, which caused difficulties in the process of producing the laminate.

WO 2015/168670 discloses certain phosphate esters that were used in improving solvent-borne laminating adhesives. It is desired to provide a new composition that, when included in a laminating adhesive composition, will improve the performance of the laminate according to one or more of the performance criteria discussed above, preferably without undesirable shortening of the pot life of the laminating adhesive composition. Independently, it is desired to provide a new composition that is suitable for use either in a solvent-borne adhesive or in a solventless adhesive.

The following is a statement of the invention.

A first aspect of the present invention is a composition comprising one or more epoxy phosphate esters having structure (I)

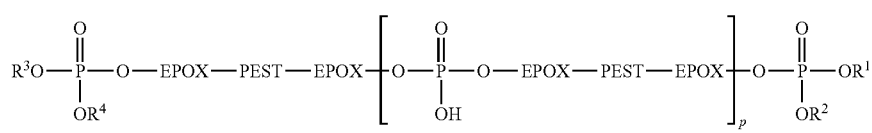

wherein each of $R^1$, $R^2$, $R^3$, and $R^4$ is independently hydrogen or an organic group,
wherein p is 0 to 3, wherein each PEST has structure (II)

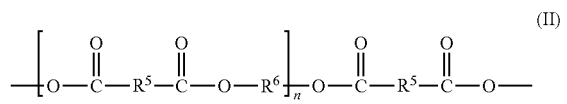

wherein each $R^5$ and each $R^6$ is an organic group, wherein n is 2 or greater, wherein each EPOX has structure (III)

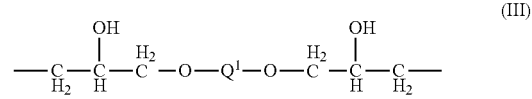

and wherein each $Q^1$ is an organic group.

A second aspect of the present invention is a method of making the composition of the first aspect, wherein the method comprises reacting one or more epoxy-terminated polyesters with one or more phosphoric acids.

A third aspect of the present invention is an adhesive composition comprising one or more multi-functional isocyanate prepolymers, one or more multifunctional isocyanate-reactive compounds, and one or more composition of the first aspect.

A fourth aspect of the present invention is a method of making a laminate comprising A) applying a layer of the adhesive composition of the third aspect to a first face of a first film, B) bringing a first face of a second film into contact with the layer of the adhesive composition of the third aspect, C) curing the layer of the adhesive composition of the third aspect.

A fifth aspect of the present invention is laminate formed by the method of the fourth aspect.

The following is a detailed description of the invention.

As used herein, the following terms have the designated definitions, unless the context clearly indicates otherwise.

As used herein, an organic group is a group of atoms that are connected to each other through covalent bonds and that contain one or more carbon atoms. As used herein, an acid-terminated polyester kernel is a PEST group having structure (II) as defined above. As used herein, an ester linkage is a group having structure (IV):

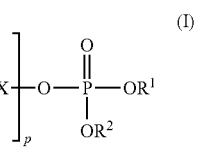

A compound having three or more ester linkages is a polyester. As used herein, an epoxy-terminated compound has the structure (V):

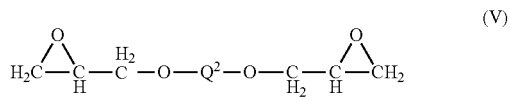

where $Q^2$ is an organic group. When $Q^2$ contains one or more acid-terminated polyester kernel, then the structure (V) is known herein as an epoxy-terminated polyester.

As used herein an ether linkage has the structure —O—, where oxygen atom is connected to two carbon atoms, and the ether linkage is not part of an ester linkage. An organic group containing an ether linkage is an ether group. A compound having three or more ether linkages is a polyether.

As used herein, a "multi-acid" is a compound having two or more carboxylic acid groups, each of which may be in neutral form or in anion form. A diacid is a multi-acid having exactly two carboxylic acid groups.

As used herein, a polyol is a compound having two or more hydroxyl groups, and a diol is a polyol having exactly two hydroxyl groups. A triol is a polyol having exactly three hydroxyl groups. A polyol that is also a polyether is a polyether polyol. A polyol that is also a polyester is a polyester polyol. A natural oil polyol is a polyol contained in one or more oils extracted from one or more plants, from one or more animals, or from a mixture thereof. Most natural oil polyols have the structure of fatty triglycerides having pendant hydroxyl groups.

As used herein, the class of "phosphoric acids" includes any compound having one or more OH group attached to a phosphorous atom or having an anion that could be formed by the removal of the H atom from an OH group of such a compound. Examples of phosphoric acids include phosphoric acid (also known as orthophosphoric acid or phosphoric (V) acid), pyrophosphoric acid, tripolyphosphoric acid, tetrapolyphosphoric acid, other oligo- and polyphosphoric acids, cyclophosphoric acids, anions thereof, and mixtures thereof.

As used herein, a multifunctional isocyanate compound is a compound having two or more isocyanate groups. As used herein, a urethane linkage is a group having structure (VI)

(VI)

As used herein, a urea linkage is a group having structure (VII)

(VII)

As used herein, a multifunctional isocyanate monomer is a multifunctional isocyanate compound having molar mass of 800 g/mol or less. As used herein, a multifunctional isocyanate prepolymer is a multifunctional isocyanate compound having molar mass greater than 800 g/mol and having two or more groups that are chosen from urethane linkages or urea linkages or a mixture thereof. As used herein a phosphate ester linkage is a group having the structure (VIIIA), and a phosphate group is a group having the structure (VIIIB),

(VIIIA)

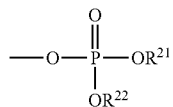
(VIIIB)

where $R^{21}$ and $R^{22}$ is each independently a hydrogen or an organic group.

As used herein, an isocyanate-reactive group is a group other than an isocyanate that is capable of reacting with an isocyanate group. Common isocyanate-reactive groups are hydroxyl groups and amine groups. As used herein, an isocyanate-reactive compound is a compound having one or more isocyanate-reactive groups. As used herein, a multifunctional isocyanate-reactive compound is a compound having two or more isocyanate-reactive groups.

The acid value (AV) of a compound is determined by ASTM 974 (American Society of Testing and Materials, West Conshohocken, PA, USA), and is reported in units of mg of KOH per gram of compound. The hydroxyl value (also called OH number, or OHN) of a compound is determined by ASTM 4274 (American Society of Testing and Materials, West Conshohocken, PA, USA), and is reported in units of mg of KOH per gram of compound. The epoxy equivalent weight (EEW) of a compound is determined by ASTM D1652, and is reported in units of g/mol. The molecular weight of a polymeric material is characterized herein using size exclusion chromatography (SEC) by Mn, the number-average molecular weight, or by Mw, the weight-average molecular weight. Mn and Mw are reported in units of g/mol or, equivalently, Daltons. The NCO % of a compound is the weight of all isocyanate groups in that compound, as a percentage of the total weight of the compound, and NCO % is assessed by ASTM D2572.

As used herein, a solvent is a composition that is liquid over a temperature range that includes 15° C. to 25° C.

The viscosity of a material is determined at 25° C. or at any specified temperature by Brookfield viscometer. The specific model of viscometer and the specific measurement conditions are chosen as appropriate for the material being tested, as shown in detail below.

As used herein, a film is an object that is solid over a temperature range that includes 0° C. to 40° C. One dimension of a film is 1 mm or less, and the other two dimensions are each 5 cm or larger. The dimension that is 1 mm or less is known as the thickness of the film, and the two surfaces that are perpendicular to the thickness are known as the faces of the film.

The present invention involves an epoxy phosphate ester having structure (I) as defined above. Preferably, each of $R^1$, $R^2$, $R^3$, and $R^4$ has 8 or fewer carbon atoms; more preferably 6 or fewer carbon atoms; more preferably 4 or fewer carbon atoms. Preferably, one or more of $R^1$, $R^2$, $R^3$, and $R^4$ is hydrogen; more preferably one or more of $R^1$ and $R^2$ is hydrogen and also one or more of $R^3$ and $R^4$ is hydrogen; more preferably each of $R^1$, $R^2$, $R^3$, and $R^4$ is hydrogen.

Preferably, p is 0, 1, 2, or 3; more preferably 0, 1, or 2. In some embodiments, the composition of the present invention contains a mixture of compounds having structure (I), having (possibly among one or more other differences) different values of p.

When p is 2 or 3, structure (I) shows p units arranged in a linear chain. Among the p units, the PEST group in any one unit may be the same as or different from the PEST group in any other unit. In general, each PEST group shown in structure (I) may be the same as or different from any other PEST group shown in structure (I).

Each PEST group conforms to structure (II), which shows n units arranged in a linear chain. Among those n units, every $R^5$ group may be the same as every other $R^5$ group, or there may be two or more different $R^5$ groups among the n units. Similarly, among those n units, every $R^6$ group may be the same as every other $R^6$ group, or there may be two or more different $R^6$ groups among the n units. The $R^5$ group outside the brackets in structure (II) may be the same as or different from any of the $R^5$ groups within the brackets. Any $R^5$ group may be the same as or different from any $R^6$ group. Optionally, each of $R^5$ and $R^6$ independently may be branched and/or have additional linkages and/or substituents including, for example, carboxyl groups, hydroxyl groups, amine groups, ester linkages, ether linkages, urethane linkages, urea linkages, or combinations thereof.

Each $R^5$ and each $R^6$, independently, may be linear, branched, cyclic, or any combination thereof. Each $R^5$ and each $R^6$, independently, optionally contains one or more functional group such as, for example, hydroxyl, phosphate, or mixtures thereof. Preferably none of the $R^5$ groups or $R^6$ groups have any isocyanate groups. Each $R^5$ and each $R^6$, independently, optionally contains one or more linkages other than ester linkages, such as, for example, ether linkages, urethane linkages, urea linkages, phosphate ester linkages, and combinations thereof.

Preferably, $R^5$ has 14 or fewer carbon atoms; more preferably 10 or fewer carbon atoms. Preferably, $R^5$ has 2 or more carbon atoms. Preferably, $R^5$ has no atoms other than carbon or hydrogen atoms. $R^5$ may be aliphatic (i.e., containing no aromatic rings), aromatic (i.e., containing one or more aromatic ring), a mixture of aliphatic groups, a mixture of aromatic groups, or a mixture of one or more aliphatic and one or more aromatic groups. Among aliphatic $R^5$ groups, preferred are alkyl groups with 8 or fewer carbon atoms; more preferably 6 or fewer carbon atoms. Among aromatic $R^5$ groups, preferred are aromatic groups with two or fewer aromatic rings, which may be fused on unfused, and which may be substituted or unsubstituted; more preferred are aromatic groups with a single aromatic ring of 6 carbon atoms; more preferred are unsubstituted aromatic groups with a single aromatic ring of 6 carbon atoms. Preferably, $R^5$ groups are present that are a mixture of aliphatic $R^5$ groups and aromatic $R^5$ groups.

Preferably, $R^6$ has 10 or fewer carbon atoms; more preferably 8 or fewer carbon atoms; more preferably, 6 or fewer carbon atoms. Preferably, $R^6$ contains no aromatic ring. Preferably, $R^6$ has no atoms other than oxygen, carbon, or hydrogen atoms. Preferred $R^6$ groups are either alkyl groups or ether groups, or a mixture of alkyl $R^6$ groups and ether $R^6$ groups may be present. Among alkyl $R^6$ groups, preferred are those with 4 or fewer carbon atoms. An ether $R^6$ group has the structure —(—$R^9$—O—$R^{10}$—)—, where each of $R^9$ and $R^{10}$ is independently an alkyl group. Preferably, each of $R^9$ and $R^{10}$ has 4 or fewer carbon atoms. Preferably, a mixture of alkyl $R^6$ groups and ether $R^6$ groups is present.

Preferably, n is 4 or more. Preferably, n is 100 or less; more preferably 50 or less; more preferably 20 or less.

Regarding the EPOX groups, when p is 2 or 3, structure (I) shows p units arranged in a linear chain. Within one unit, any EPOX group may be the same as or different from another EPOX group in the same unit. Among the p units, any EPOX group in any one unit may be the same as or different from any EPOX group in any other unit. In general, each EPOX group shown in structure (I) may be the same as or different from any other EPOX group shown in structure (I).

Each EPOX group conforms to structure (III) above. In structure (III), $Q^1$ optionally contains one or more functional group such as, for example, hydroxyl, amine, carboxyl, epoxy, or mixtures thereof. Optionally, $Q^1$ is a branched structure. $Q^1$ optionally contains one or more linkages other than ester linkages, such as, for example, ether linkages, urethane linkages, urea linkages, and combinations thereof. Preferably, $Q^1$ is an aliphatic group; more preferably, $Q^1$ is an alkyl group; more preferably, $Q^1$ is a linear alkyl group. Preferably, $Q^1$ has 12 or fewer carbon atoms; more preferably 8 or fewer carbon atoms; more preferably 6 or fewer carbon atoms. Preferably, $Q^1$ has 2 or more carbon atoms, more preferably 3 or more carbon atoms.

Any composition of the present invention may or may not contain solvent. When solvent is present, preferred solvents contain one or more compound that is not a hydrocarbon. Suitable solvents include, for example, ethyl acetate, methyl ethyl ketone, butyl acetate, methyl butyl ketone, other organic solvents, and mixtures thereof.

The epoxy phosphate ester of structure (I) may be made by any method. Preferably, the epoxy phosphate ester of structure (I) is made by a method, herein called method (A), that includes the step of reacting one or more epoxy-terminated polyesters with one or more phosphoric acids. Epoxy-terminated polyester is defined above in structure (V), and the class of phosphoric acids is defined above.

In the practice of Method A, the epoxy-terminated polyester preferably has structure (IX)

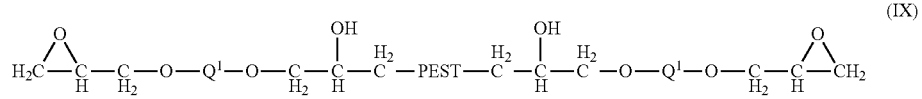

(IX)

where the definitions and preferences for $Q^1$ and PEST are discussed above.

In the practice of method (A), the preferred choice from among the phosphoric acids is a phosphoric acid that has molar mass of 600 g/mol or lower; more preferably 400 g/mol or lower; more preferably 200 g/mol or lower; more preferably 100 g/mol or lower. The preferred choice is orthophosphoric acid.

Preferably, in the practice of method (A), when the phosphoric acid is brought into contact with the epoxy-terminated polyester, the phosphoric acid is in the form of a solution in water. The preferred concentration of the phosphoric acid in water is, by weight based on the weight of the solution, 50% or more; more preferably 75% or more; more preferably 80% or more. It is considered that, in the solution in water, the phosphoric acid will exist as a mixture of neutral phosphoric acid and anions thereof. For example, it is considered that, in a solution in water, orthophosphoric acid will exist as a mixture of two or more of orthophosphoric acid, orthophosphate anion (also called phosphate anion), hydrogen phosphate anion, and dihydrogen phosphate.

In the practice of method (A), the epoxy-terminated polyester and the phosphoric acid may be brought together under any conditions that will result in a chemical reaction to produce one or more epoxy phosphate esters of structure (I). The epoxy-terminated polyester may be in the form of a solute in solution in a solvent or may be neat. "Neat" means that the epoxy-terminated polyester either contains no solvent or else contains solvent in an amount, by weight based on the total weight of the epoxy-terminated polyester, of 0 to 2%; more preferably 0 to 1%.

Preferred epoxy-terminated polyesters have acid value of less than 1 mg KOH per gram; more preferably less than 0.5 mg KOH per gram; more preferably less than 0.2 mg KOH per gram. Viscosity of epoxy-terminated polyesters is measured by DV-II+ Brookfield viscometer at 25° C. with #27 spindle at 20 rpm.

Among neat epoxy-terminated polyesters, preferred epoxy-terminated polyesters have viscosity at 25° C. of 50 mPa*s or higher; more preferably 100 mPa*s or higher. Among neat epoxy-terminated polyesters, preferred epoxy-terminated polyesters have viscosity at 25° C. of 2,000 mPa*s or lower; more preferably 1,000 mPa*s or lower; more preferably 500 mPa*s or lower. Among neat epoxy-terminated polyesters, preferred epoxy-terminated polyesters have epoxy equivalent weight of 500 g/mol or higher; more preferably 1,000 g/mol or higher. Among neat epoxy-terminated polyesters, preferred epoxy-terminated polyesters have epoxy equivalent weight of 5,000 g/mol or less; more preferably 2,500 g/mol or less. Among neat epoxy-terminated polyesters, preferred epoxy-terminated polyesters have Mn of 500 g/mol or higher; more preferably 1,000 g/mol or higher. Among neat epoxy-terminated polyesters, preferred epoxy-terminated polyesters have Mn of 10,000 g/mol or lower; more preferably 5,000 g/mol or lower.

When epoxy-terminated polyester is present as a solute dissolved in a solution, preferably the solution has viscosity at 25° C. of 50 mPa*s or higher; more preferably 100 mPa*s or higher. When epoxy-terminated polyester is present as a solute dissolved in a solution, preferably the solution has viscosity at 25° C. of 2,000 mPa*s or lower; more preferably 1,000 mPa*s or lower; more preferably 500 mPa*s or lower. When epoxy-terminated polyester is present as a solute dissolved in a solution, preferably the epoxy-terminated polyesters has epoxy equivalent weight of 1000 g/mol or higher; more preferably 2,000 g/mol or higher. When epoxy-terminated polyester is present as a solute dissolved in a solution, preferably the epoxy-terminated polyesters has epoxy equivalent weight of epoxy equivalent weight of 15,000 g/mol or less; more preferably 7,500 g/mol or less. When epoxy-terminated polyester is present as a solute dissolved in a solution, preferably the epoxy-terminated polyesters has Mn of 100 g/mol or higher; more preferably 1,000 g/mol or higher. When epoxy-terminated polyester is present as a solute dissolved in a solution, preferably the epoxy-terminated polyesters has Mn of 30,000 g/mol or lower; more preferably 15,000 g/mol or lower.

Preferably, when the epoxy-terminated polyester and the phosphoric acid are brought together, the conditions are such that both the epoxy-terminated polyester and the phosphoric acid are liquids. That is, it is preferable that the neat epoxy-terminated polyester is a liquid under those conditions, and it is preferable that the phosphoric acid is in the form of a liquid solution in water. When the epoxy-terminated polyester and the phosphoric acid are brought together, the result is reaction mixture AM. Preferably, no additional ingredients that react with either the epoxy-terminated polyester or the phosphoric acid solution are included in reaction mixture AM. Preferably the amount of all ingredients present in reaction mixture AM other than the epoxy-terminated polyester and the phosphoric acid solution is, by weight based on the total weight of reaction mixture AM, 0 to 5%; more preferably 0 to 2%; more preferably 0 to 1%.

In the practice of method (A), the epoxy-terminated polyester may be made by any method. In a preferred method of making the epoxy-terminated polyester (herein called method (A1)), one or more carboxyl-terminated polyesters are reacted with one or more epoxy-terminated compounds.

In the practice of method (A1), the carboxyl-terminated polyester has the structure H-PEST-H, where PEST is defined above, and where the acceptable and preferred definitions of $R^5$, $R^6$, and n are the same as those described above.

The epoxy-terminated compound used in method (A1) has the structure (X)

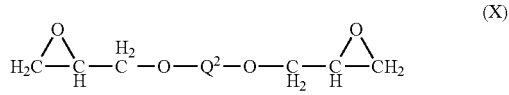

where the definition and preferences for $Q^2$ are the same as those for $Q^1$, as discussed above.

Preferably, the number of epoxy groups per molecule of the epoxy-terminated compound is 5 or fewer; more preferably 4 or fewer; more preferably 3 or fewer; more preferably 2. Preferably, the molar mass of the epoxy-terminated compound is 2,000 g/mol or lower; more preferably 1,000 g/mol or lower; more preferably 500 g/mol or lower; more preferably 250 g/mol or lower.

Preferably, when the carboxyl-terminated polyester is reacted with the epoxy-terminated compound, an excess of epoxy groups, on a molar basis, is used.

When a carboxyl-terminated polyester is used, the carboxyl-terminated polyester may be made by any method. In a preferred method of making a carboxyl-terminated polyester, one or more multi-acids is reacted with one or more polyols to produce a polyester. Preferably, an excess of carboxyl groups, on a molar basis, is used.

Among multi-acids, preferred are those in which the number of carboxyl groups per molecule is 3 or fewer; more preferably 2. Preferred multi-acids have 14 or fewer carbon atoms; more preferably 10 or fewer carbon atoms. Preferred multi-acids contain one or more aromatic ring. Preferred multi-acids have no atoms other than hydrogen and carbon outside of the carboxyl groups.

Among polyols, preferred are those in which the number of hydroxyl groups per molecule is 3 or fewer; more preferably 2. Preferred polyols have 8 or fewer carbon atoms; more preferably 6 or fewer carbon atoms; more preferably 4 or fewer carbon atoms. Preferred polyols contain, between two of the carboxyl groups, one or more aromatic ring, one or more aliphatic group, or a combination thereof. Preferred polyols have no atoms other than hydrogen and carbon outside of the hydroxyl groups.

Preferably, the carboxyl-terminated polyester has acid value of 50 or higher; more preferably 75 or higher; more preferably 100 or higher. Preferably, the carboxyl-terminated polyester has acid value of 500 or lower. The viscosity of carboxyl-terminated polyesters is measured by Brookfield CAP 2000+ viscometer. Preferably, the carboxyl-terminated polyester has viscosity at 25° C. of 20,000 mPa*s or higher; more preferably 50,000 mPa*s or higher; more preferably 100,000 mPa*s or higher. Preferably, the carboxyl-terminated polyester has viscosity at 25° C. of 800,000 mPa*s or lower; more preferably 500,000 mPa*s or lower. Preferably, the carboxyl-terminated polyester has Mn of 200 g/mol or higher; more preferably 400 g/mol or higher. Preferably, the carboxyl-terminated polyester has Mn of 5,000 g/mol or lower; more preferably 2,000 g/mol or lower.

The epoxy phosphate ester of structure (I) may be used for any purpose. A preferred use is as an ingredient in an adhesive composition that contains the epoxy phosphate ester, one or more multifunctional isocyanate-reactive compounds, and one or more multi-functional isocyanate prepolymers.

The adhesive composition may or may not contain solvent. When solvent is present, the amount of solvent, by weight based on the weight of the adhesive composition, is preferably 10% or more; more preferably 20% or more. When solvent is present, the amount of solvent, by weight based on the weight of the adhesive composition, is preferably 80% or less; more preferably 70% or less. Preferably, the adhesive composition contains little or no solvent. That is, preferably the amount of solvent in the adhesive composition is, by weight based on the total weight of the adhesive composition, 0 to 10%; more preferably 0 to 5%; more preferably 0 to 2%; more preferably 0 to 1%.

Preferred multi-functional isocyanate prepolymers for inclusion in the adhesive composition, prior to mixing with other ingredients in the adhesive composition, may be in the form of solute in solution in a solvent, or may be in the form of having little or no solvent. Among embodiments in which there is little or no solvent in the multi-function isocyanate prepolymer, the amount of solvent is, by weight based on the total weight of the multi-function isocyanate prepolymer, 0 to 10%; more preferably 0 to 5%; more preferably 0 to 2%; more preferably 0 to 1%.

Multi-functional isocyanate prepolymers for inclusion in the adhesive composition optionally contain one or multifunctional isocyanate monomers.

Preferred multi-functional isocyanate prepolymers have total NCO % of 5% or more; more preferably 10% or more. Preferred multi-functional isocyanate prepolymers have NCO % of 30% or less; more preferably 20% or less, more preferably 15% or less.

The viscosity of multi-functional isocyanate prepolymers is determined by Brookfield viscometer DV-II+ with spindle #27 at 20 rpm at 25° C. Preferred multi-functional isocyanate prepolymers have viscosity at 25° C. of 500 mPa*s or higher; more preferably 1,000 mPa*s or higher. Preferred multi-functional isocyanate prepolymers have viscosity at 25° C. of 100,000 mPa*s or lower; more preferably 50,000 mPa*s or lower.

Preferred multi-functional isocyanate prepolymers are reaction products of one or more multifunctional isocyanate monomers and one or more polyols. Preferred multifunctional isocyanate monomers for use in making the multifunctional isocyanate prepolymer have exactly two isocyanate groups. Preferred polyols for use in making the multi-functional isocyanate prepolymer are selected from polyether polyols, polyester polyols, polyether polyester polyols, natural oil polyols, and mixtures thereof.

The adhesive composition preferably contains one or more multifunctional isocyanate-reactive compounds. Preferably, the adhesive composition contains one or more polyol. Polyols present in the adhesive composition preferably include polyether polyols, polyester polyols, and blends thereof. Polyols present in the adhesive composition preferably include diols, triols, and mixtures thereof. Polyols present in the adhesive composition preferably include one or more polyols having Mw of 300 g/mol or higher; more preferably 500 g/mol or higher. Polyols present in the adhesive composition preferably include one or more polyols having Mw of 5,000 g/mol or lower; more preferably 2,500 g/mol or lower.

Preferably, the adhesive composition contains little or no amount of any compounds other than multifunctional isocyanate compounds, multifunctional isocyanate-reactive compounds, and epoxy phosphate esters of structure (I). That is, preferably the amount of all compounds other than multifunctional isocyanate compounds, multifunctional isocyanate-reactive compounds, and phosphate esters of structure (I) is, by weight based on the weight of the adhesive composition, 0 to 10%; more preferably 0 to 5%; more preferably 0 to 2%; more preferably 0 to 1%.

The adhesive composition may be made by any method. In a preferred method, a mixture (herein called "pack A") is made that contains all of the isocyanate-reactive compounds and all of the epoxy phosphate esters that will be used in the adhesive composition, in the absence of any isocyanate compounds. Preferably, a separate mixture (herein called "pack B") contains of all the isocyanate compounds that will be used in the adhesive composition, in the absence of isocyanate-reactive compounds. Preferably, pack A and pack B are stored separately and then, a short time before the adhesive composition is to be used, pack A and pack B are brought into contact and mixed together to form a reactive mixture, which is then applied to a substrate.

Pack A may contain solvent or may contain little or no solvent. When pack A contains solvent, preferably the amount of solvent in pack A is, by weight based on the weight of pack A, 10% or more; more preferably 20% or more. When pack A contains solvent, preferably the amount of solvent in pack A is, by weight based on the weight of pack A, 80% or less; more preferably 70% or less. When pack A contains little or no solvent, preferably the amount of solvent in pack A is, by weight based on the weight of pack A, is 0 to 5%; more preferably 0 to 2%; more preferably 0 to 1%.

Independently of pack A, pack B may contain solvent or may contain little or no solvent. When pack B contains solvent, preferably the amount of solvent in pack B is, by weight based on the weight of pack B, 10% or more; more preferably 20% or more. When pack B contains solvent, preferably the amount of solvent in pack B is, by weight based on the weight of pack B, 80% or less; more preferably 70% or less. When pack B contains little or no solvent, preferably the amount of solvent in pack B is, by weight based on the weight of pack B, is 0 to 5%; more preferably 0 to 2%; more preferably 0 to 1%.

It is expected that when pack A and pack B are brought into contact and mixed together, a chemical reaction (the "cure reaction") between the isocyanate groups and the isocyanate-reactive groups will begin. Preferably, when pack A and pack B are brought into contact and mixed together, the resulting reactive mixture is a liquid. It is expected that eventually the cure reaction will cause the viscosity of the reactive mixture to gradually increase, eventually resulting in a viscosity so high that it becomes difficult or impossible to apply the reactive mixture to a substrate. The viscosity value of 4,500 mPa*s (as measured by Brookfield DV-II+ viscometer with spindle #27 at 20 rpm) is taken herein as the maximum viscosity at which the adhesive composition can be applied to a substrate without unreasonable difficulty. The time from mixing to reaching 4,500 mPa*s is known herein as the "pot life." Preferably, the pot life is long enough so that the reactive mixture can be applied to substrate without difficulty. The mixing operation and the operation of applying the adhesive composition to a substrate may optionally be performed at a temperature above room temperature, for example between 30 and 50° C.

The adhesive composition may be used to bond together any pair of substrates. Preferred substrates are films. The process of bonding a face of one film to the face of a second film under pressure is called lamination, and the resulting bonded article is known as a laminate. Preferred films are polyethylene, polyethylene terephthalate, polypropylene, and metal. Preferably one or more of the films is metal, preferably aluminum. Lamination is typically performed using a laminating machine.

The following are examples of the present invention. Operations were performed at room temperature (approximately 23° C.) except where otherwise stated.

Raw materials used to prepare the compositions described in the examples are described below:

| Material | Description | Supplier |
| --- | --- | --- |
| Orthophosphoric acid | 85% by weight in water | Sigma-Aldrich |
| Dibutyl phosphate | Phosphoric acid dibutyl ester, pure, ≥97% | Sigma-Aldrich |
| Polyphosphoric acid | 115 grade, pure, >84% phosphate | ACROS Organics |
| MOR-FREE ™ C-411 | blend of polyether polyol and polyester polyol | Dow Chemical |
| MOR-FREE ™ L75-164 | Isocyanate prepolymer based on polyester-polyether blend | Dow Chemical |
| VORANOL ™ CP 450 | Polyether triol based on polypropylene oxide with a 450 Mw | Dow Chemical |
| VORANOL ™ CP 755 | Polyether triol based on polypropylene oxide with a 700 Mw | Dow Chemical |
| VORANOL ™ CP 1055 | Polyether triol based on polypropylene oxide with a 1000 Mw | Dow Chemical |
| ISONATE ™ 125M | Crystalline, pure diphenyl methane diisocyanate (MDI) | Dow Chemical |
| ISONATE ™ 143L | Liquid, polycarbodiimide-modified MDI | Dow Chemical |
| Ethyl Acetate | solvent | Sigma-Aldrich |
| castor oil | natural oil polyol | Dow Chemical |

Further raw materials used to prepare the compositions described in the examples are described below:

| Material | Description | Supplier |
| --- | --- | --- |
| GF-19 | linear low density polyethylene sealant film | Berry Plastics Corp. |
| 92LBT | 24 μm thick polyethylene terephthalate film | DuPont |
| Prelam foil | 12 μm Polyethylene terephthalate film laminated to soft lamination grade AMCOR ™ aluminum foil having thickness of 9 μm with ADCOTE ™ 550/COREACTANT F | AMPAC Company |
| 3 mil CPP | cast polypropylene film with 76 μm thickness | Berry Plastics Corp. |

Lamination

Polyols (including one or more compound of structure (I), where indicated below) and isocyanate prepolymers were mixed in the ratios specified in the examples and the mixture was applied to a primary film, followed by laminating it with a secondary film using a Nordmeccanica Labocombi pilot laminator under standard conditions. Bond strength between the two films measured at various intervals after the lamination. After 7 days, pouches were made using the laminate structure and filled with a 1:1:1 sauce (blend of equal parts by weight of ketchup, vinegar and vegetable oil) for boil-in-bag and chemical aging tests; retort test was performed using 3% by volume acetic acid aqueous solution as described below.

Bond Strength Measurement

The 900 T-peel test was done on laminate samples cut to 2.54 cm (1 inch) wide strips and pulled on a Thwing Albert™ QC-3A peel tester equipped with a 50N loading cell at a rate of 25.4 cm/min (10 inch/min). When the two films in the laminate separated (peeled), the average of the force (grams per 2.54 cm of width, or g/in) during the pull was recorded. If one of the films stretched or broke, the maximum force or force at break (grams per 2.54 cm of width, or g/in) was recorded. The values represent the average over at least four identical strips for each sample. The failure mode (FM) or mode of failure (MOF) was recorded as below:

| | |
| --- | --- |
| FS: | Film Stretch |
| FT: | Film Tears or Breaks |
| DL: | Delaminated, the secondary film separated from the primary film |
| AT: | Adhesive Transfer (adhesive fails to adhere to the primary film and is transferred to the secondary film). |
| AS: | Adhesive Split or cohesive failure (adhesive is found on both primary and secondary film) |

Boil-in-Bag Test Procedure

Laminates were made from the Prelam A1/GF-19, or Prelam/CPP as described above. One of the 23 cm×30.5 cm (9"×12") sheets of laminate was folded over to give a double layer about 23 cm×15.3 cm (9"×6") such that the polymer film of one layer was in contact with the polymer film of the other layer. The edges were trimmed on a paper cutter to give a folded piece about 12.7×17.8 cm (5"×7"). Two long sides and one short side was heat sealed at the edges to give a finished pouch with an interior size of 10.2 cm×15.2 cm (4"×6"). The heat sealing was done at 177° C. (350° F.) for 1 second at a hydraulic pressure of 276 kPa (40 psi). Two or three pouches were made for each test.

Pouches were filled through the open edge with 100±5 ml of 1:1:1 sauce (blend of equal parts by weight of ketchup, vinegar and vegetable oil). Splashing the filling onto the heat seal area was avoided as this could cause the heat seal to fail during the test. After filling, the top of the pouch was sealed in a manner that minimized air entrapment inside of the pouch. The seal integrity was inspected on all four sides of pouches to ensure that there were no flaws in the sealing that would cause the pouch to leak during the test. Any defective pouches were discarded and replaced. In some cases, flaws in the laminate were marked to identify whether new additional flaws were generated during the testing.

A pot was filled ⅔ full of water and brought to a rolling boil. The boiling pot was covered with a lid to minimize water and steam loss. The pot was observed during the test to ensure that there was enough water present to maintain boiling. The pouches were placed in the boiling water and kept there for 30 minutes. The pouches were removed and the extent of tunneling, blistering, de-lamination, or leakage was compared with any of the marked preexisting flaws. The observations were recorded. The pouches were cut open, emptied, and rinsed with soap and water. One or more strips of 2.54 cm (one inch) width were cut from the pouches and the laminate bond strength was measured according to the standard bond strength test described earlier. This was done as soon as possible after removing the pouch contents. The interiors of the pouches were examined and any other visual defects were recorded.

Chemical Aging Test Procedure

Pouches were made as in the Boil-in-Bag test described above, using laminates that were made from the Prelam A1/GF-19, or Prelam/CPP as described above. The pouches were then filled through the open edge with 100±5 ml of 1:1:1 sauce as described above in the Boil-in-Bag test.

The pouches containing the 1:1:1 sauce were then placed in a convection oven set at 60° C. for 100 hours. The pouches were removed after aging and the extent of tunneling, blistering, de-lamination, or leakage was compared with any of the marked preexisting flaws. The observations were recorded. The pouches were cut open, emptied, and rinsed with soap and water. One or more 2.54 cm (one inch) strips were cut from the pouches and the laminate bond strength was measured according to the standard bond strength test described earlier. This was done as soon as possible after removing the pouch contents. The interior of the pouches were examined and any other visual defects were recorded.

Retort Test Procedure

Pouches were made using the procedure described above in the Boil-in-Bag test, using laminates that were made from the Prelam/CPP as described above. The pouches were then filled and sealed as described above in the Boil-in-Bag test, except that distilled water (DI water) or 3% (by volume) acetic acid aqueous solution was used instead of the 1:1:1 sauce.

The pouches containing the DI water or 3% acetic acid solution were then placed in a STERIS autoclave set at 121° C. for 1 hour. The pouches were removed after retort and the extent of tunneling, blistering, de-lamination, or leakage was compared with any of the marked pre-existing flaws. The observations were recorded. The pouches were cut open, emptied, and rinsed with soap and water. One or more 2.54 cm (one inch) strips were cut from the pouches and the laminate bond strength was measured according to the standard bond strength test described earlier. This was done as soon as possible after removing the pouch contents. The interior of the pouches were examined and any other visual defects were recorded.

Pot-Life Measurements

Pot-life for the solvent free adhesive was determined by a Brookfield DV-II+ viscometer at 40° C. Pot-life of an adhesive at a given temperature is defined as the time it takes for the adhesive to reach 4500 mPa*s at the temperature, and was measured on a Brookfield DV-II+ viscometer with spindle #27 at 20 rpm.

MATERIAL PREPARATION

Preparation of Isocyanate-Reactive Polyols for Use in Pack B

Preparation of Epoxy Phosphate Esters

Pre-Example 1: Preparation of Carboxylic Acid Terminated Polyester

| Item | Ingredient | Charge (g) |
| --- | --- | --- |
| 1 | Isophthalic Acid | 1158.60 |
| 2 | Diethylene Glycol | 720.90 |
| 3 | Ethylene Glycol | 398.30 |
| 4 | Fascat 9100 (Hydroxybutyltin oxide) | 0.4089 |
| 5 | Adipic Acid | 1525.85 |

Charged Items 1 through 4 to the reactor at ambient temperature (approximately 25-30° C.). The reaction mixture was heated slowly to 100° C. under Nitrogen with stirring. The reaction temperature was then increased to 225° C. and held at 225° C. When approximately 50% of theoretical water has evolved, the AV and In-Process viscosity was monitored. The reactor was maintained at 225° C. until AV was less than approximately 80 mg KOH/gram. The resin was cooled to less than 125° C. and then Item 5 was added, the resin mixture was maintained at 125-130° C. for 0.50 hrs. The reactor temperature was slowly increased to 225° C. and then maintained at 225° C., vacuum at approximately 435 mm Hg was applied as needed to decrease AV to final target property. The AV and In-Process Viscosity were monitored; reaction was maintained at 225° C. until AV was less than approximately 160 mg KOH/g. Cooled resin to about 150° C., filtered and packaged.

The final resin had the following properties: Acid Value (AV) 153 mg KOH/g, $M_n$ 650 g/mol, $M_w$ 1550 g/mol, $M_z$ 2650 g/mol, Viscosity (as measured by Brookfield CAP 2000+ viscometer) at 25° C. of 173,750 mPa*s.

Pre-Example 2: Preparation of Epoxy Terminated Polyester

| Monomer/Intermediate | Charge (g) |
| --- | --- |
| Carboxylic acid terminated polyester of Pre-example 1 | 931.64 |
| D.E.R. ® 731 | 696.70 |
| Sodium Acetate | 0.6033 |
| Ethyl Acetate | 877.00 |

Diglycidyl ether of 1,4-butanediol (D.E.R.® 731 or Erisys® GE-21), the carboxylic acid terminated polyester of Pre-example 1 and catalyst were charged to the reactor. The resin mixture was slowly heated to 135-140° C. The reaction was maintained at 135-140° C. for approximately 0.50 hrs. and then heated to 150-155° C. and maintained at 150-155° C. for approximately 1.5 to 2 Hrs and then monitored AV and In-Process Viscosity. The reaction was maintained at 150-155° C. and monitored AV and In-Process Viscosity until AV was less than 1.0 mg KOH/g. The resin was cooled to approximately 80° C. and Ethyl Acetate was added and then continued cooling to approximately 55-60° C. and then transferred and packaged.

The product had the final properties: AV less than 0.1 mg KOH/g. In-Process Viscosity @ 25° C. 288.67 mPa*s, EEW 1353.6 g/mol, OH number 79.6 mg KOH/g, SEC Analysis: $M_n$ 1,850 g/mol, $M_w$ 30,000 g/mol, $M_z$ 186,550 g/mol, Polydispersity 16.2.

Example 3(a) and Pre-Example 3(b): Preparation of Different Types of Epoxy Phosphate Esters A 1 L multi-neck round bottom flask was placed in a 70° C. oven for drying overnight. A designated amount of epoxy terminated polyester of Pre-example 2 was charged to the flask and maintained at 25-30° C. Under continuous nitrogen flow and strong agitation, the phosphorous-containing compound as shown in Table 1 was slowly added to the flask at the desired amount. The reaction temperature was monitored and necessary cooling procedures were taken to keep the temperature below 50° C. After the exotherm has subsided, the reaction was left to carry on at 30-35° C. for overnight under continuous nitrogen flow and strong agitation. The acid value was monitored during the reaction until it stabilized at a certain value, and the product was poured out from the flask, completely dried in a vacuum oven at 45° C. for 4-5 days to remove all ethyl acetate and residual water and used for later investigation.

TABLE 1

Recipe of epoxy phosphate esters

| Ingredient | Pre-example 3(a) | Pre-example 3(b) |
|---|---|---|
| Epoxy Terminated Polyester of Pre-example 2 | 200 g | 200 g |
| Ortho-phosphoric acid (85% aqueous solution) | 39.44 g | — |
| Dibutyl phosphate | — | 3.96 g |

Comparative Example 4: Preparation of a Comparative Phosphate Ester Adhesion Promoter (not an Epoxy Phosphate Ester)

A polyether polyol was reacted with polyphosphoric acid (PPA) and a diisocyanate. The product had the following properties: 100% Solids, AV 24 mg KOH/g, OH number of 270 mg KOH/g, Viscosity at 25° C. of 17,820 mPa-s, SEC Analysis of $M_n$ 780 g/mol, $M_w$ 1415 g/mol, $M_z$ 2325 g/mol, Polydispersity of 1.82.

Adhesive formulations in which the multifunctional isocyanate reactive compound (polyol) is a blend of VORANOL™ CP 755 and VORANOL™ CP 1055 and adhesion promoter.

VORANOL™ CP 755 and VORANOL™ CP 1055 were first blended at a 70:30 weight ratio to make the base co-reactant. Promoters were then added to the CP 755/CP 1055 polyol mixture at the concentrations as listed in Table 2A, to make pack B. The blends were mixed using a Flacktek high speed mixer at a speed of 3000 rpm for 1 minute. The performance of promoter Pre-example 3(a) was directly compared with that of Pre-example 3(b).

Preparation of Multifunctional Isocyanate Prepolymer for Pack A

Pre-Example 5: Preparation of Polyester Resin to be Used in Making a Multifunctional Isocyanate Prepolymer

| Item | Ingredient | Charge (grams) |
|---|---|---|
| 1 | Propylene Glycol | 432.0 |
| 2 | 1,6-Hexanediol | 735.3 |
| 3 | Diethylene Glycol | 187.7 |
| 4 | Adipic Acid | 1937.7 |
| 5 | 75% Phosphoric Acid | 2.07 |

Items 1 through 5 were charged to a 5-Liter reactor equipped with condenser, mechanical stirrer, nitrogen purge and vacuum capabilities. The reaction mixture was heated slowly to 145-155° C. at atmospheric conditions and maintained at 145-155° C. for 1 hour and then slowly ramped to 225-230° C. When water evolution at 225-230° C. decreased at atmospheric conditions, vacuum was applied to the reactor (approximately 250-300 mm Hg) and AV was monitored until it was less than or equal to 2.5 mg KOH/g. When AV was less than or equal to 2.5 mg KOH/g, the resin was cooled to approximately 150-160° C., filtered and packaged.

The polyester had an AV of approximately 2.0 mg KOH/g and OH Number of 57.5 mg KOH/g.

Pre-Example 6: Preparation of Polyester Resin to be Used in Making a Multifunctional Isocyanate Prepolymer

| Item | Ingredient | Charge (grams) |
|---|---|---|
| 1 | Diethylene Glycol | 1396.2 |
| 2 | Isophthalic Acid | 564.3 |
| 3 | Adipic Acid | 1042.5 |
| 4 | Tyzor TPT | 0.06 |

Items 1 through 3 were charged to a 5-Liter reactor equipped with condenser, mechanical stirrer, nitrogen purge and vacuum capabilities. The reaction mixture was heated slowly to 145-155° C. under atmospheric conditions and maintained at 145-155° C. for 1 hour and then slowly ramped to 225-230° C. When water evolution at 225-230° C. decreased at atmospheric conditions vacuum was applied to the reactor (approximately 250-300 mm Hg) and AV was monitored; when AV was less than or equal to 10.0 mg KOH/g, Item 4 was added to reactor. The reactor was maintained at 225-230° C. with a vacuum of approximately 200-250 mm Hg until AV was less than or equal to 2.0 mg KOH/g. When AV was less than or equal to 2.5 mg KOH/g the resin was cooled to approximately 150-160° C., filtered and packaged.

The polyester has an AV of approximately 1.8 mg KOH/g and OHN of 111 mg KOH/g.

Pre-Example 7: Preparation of the MDI Terminated Polyurethane Prepolymer (i.e., Multifunctional Isocyanate Prepolymer) for Use in Pack B of the Adhesive Composition

| Item | Ingredient | Charge (grams) |
| --- | --- | --- |
| 1 | Polyester of Pre-example 5 | 861.3 |
| 2 | Polyester Resin of Pre-example 6 | 559.7 |
| 3 | Castor oil | 14.5 |
| 4 | ISONATE ™ 125M | 1171.6 |
| 5 | ISONATE ™ 143L | 292.9 |

A 5-Liter reactor equipped with mechanical stirrer, condenser and Nitrogen purge was charged with Item 4 at 50° C. and then Item 1 was charged to reactor at 50° C., the reaction mixture exothermed to approximately 60-65° C. After approximately 1 hr, when the reaction mixture was stable at 60-65° C. Item 2 and 3 were added to the reactor and reaction mixture exothermed to approximately 85-90° C. and then was maintained at 85 C for 3 hours. After the 3 hours hold at 85° C., Item 5 was added to the reactor and maintained at 85° C. for 2 hours. The resin was cooled to less than or equal to 60° C., filtered and packaged.

The product had the following properties: 100% Solids, NCO % 13.4%, Viscosity (as measured by Brookfield DV-II+ with spindle #27 at 20 rpm) at 25° C. of 9780 mPa·s.

TABLE 2A

| Compositions of adhesive compositions based on CP 755/CP 1055. Amounts shown are in grams. | | | | |
| --- | --- | --- | --- | --- |
| | Comparative Example 8 | Example 9 | Example 10 | Example 11 |
| Prepolymer of Pre-example 7 | 150 | 150 | 150 | 150 |
| VORANOL ™ CP 755 | 70 | 70 | 70 | 70 |
| VORANOL ™ CP 1055 | 30 | 30 | 30 | 30 |
| promoter: Pre-example 3(a) | 0 | 0.54 | 1.26 | 0 |
| promoter: Pre-example 3(b) | 0 | 0 | 0 | 11.2 |
| Promoter concentration in the full formulation (wt. %) | 0 | 0.21 | 0.50 | 4.03 |

TABLE 2B

Viscosity versus time. The results shown are viscosity at 40° C., as measured as described above in the definition of the Pot Life testing. Units are mPa*s.

| minutes | Comparative Example 8 | Example 9 | Example 10 | Example 11 |
| --- | --- | --- | --- | --- |
| 0 | 1375 | 1150 | 1650 | 1350 |
| 10 | 925 | 1100 | 1100 | 950 |
| 20 | 1050 | 1370 | 1375 | 1100 |
| 30 | 1244 | 1710 | 1800 | 1375 |
| 40 | 1463 | 2110 | 2325 | 1675 |
| 60 | 2019 | 3160 | 3725 | 2425 |
| 80 | 2769 | 4590 | 5775 | 3500 |
| 100 | 3788 | 6550 | — | 4675 |
| 120 | 5040 | — | — | 6250 |

TABLE 2C

| Pot life results | | | | |
| --- | --- | --- | --- | --- |
| | Comparative Example 8 | Example 9 | Example 10 | Example 11 |
| Pot Life (min) | 112 | 79 | 69 | 98 |

Examples 9, 10, and 11 all have pot life of greater than 40 minutes and less than 100 minutes, which is acceptable. Comparative example 8 had pot life of 112 minutes, which is undesirably long.

The mixtures of Comparative Example 8 and Examples 9-11 were then applied on the Prelam A1 Foil (foil side) or the 92LBT (PET) film with a coating weight of 1.05 lbs/ream (1.71 g/m$^2$), followed by laminating it with GF-19 (PE) film using a Nordmeccanica LaboCombi laminator. Laminates were tested for the bond strength after 4 hours, one day, seven days, boil-in-bag and chemical aging. Results are listed in Tables 3A and 3B.

In Tables 3A and 3B, Example 9 and Example 10 evidently show that on the prelam A1//GF-19 structure, the bond strength and the boil-in-bag resistance have been significantly enhanced with the use of the epoxy phosphate ester of Pre-example 3(a), and the improvement strongly depends on the promoter concentration. Also, the bond strength after chemical aging has been doubled due to the addition of epoxy phosphate ester of Pre-example 3(a). On the other hand, Example 11 shows some improvement in the dry bond, boil-in-bag and aging performance over the comparative Example 8 on prelam A1//GF-19, but the improvement is somewhat limited. It suggests that the epoxy phosphate ester of Pre-example 3(a) exhibits much better adhesion promoting effects compared to the Pre-example 3(b). In addition, on the 92LBT (PET)//GF-19 structure, as shown in Table 3B, the dry bond strength has also been improved significantly with the use of either Pre-example 3(a) or Pre-example 3(b).

In the boil-in-bag and chemical aging tests, Examples 9, 10, and 11 performed acceptably well, showing performance slightly worse than, but comparable to, the performance of Comparative Example 8.

In the dry bond testing, it should be noted that the mode of failure for PET/GF-19 structures with the phosphate epoxy esters is Film Tear (FT) in comparison to the Control Example 8 without the phosphate epoxy esters which exhibits Adhesive Split (AS) prior to boil-in-bag testing. In dry bond testing, FT failure mode is considered to show excellent performance of the adhesive composition.

TABLE 3A

Dry bond performance for the laminates prepared with Comparative Example 8 and Examples 9 to 11 on foil//PE structures. Dry bond was measured at various intervals after formation of the sample. Results are reported in grams of force per 2.54 cm of width of sample (g/in), along with the failure mode.

|  | Comp. Example 8 | Example 9 | Example 10 | Example 11 |
|---|---|---|---|---|
| 4 hour dry bond | 284 (AS) | 322 (AS) | 351 (AS) | 323 (AS) |
| 1 day dry bond | 368 (AS) | 718 (AS) | 778 (AT) | 404 (AS) |
| 7 day dry bond | 352 (AS) | 585 (AS) | 714 (FT) | 338 (AS) |
| Boil-in-bag | 278 (AS) | 736 (AS) | 682 (AS) | 341 (AS) |
| Aging | 18 (AS) | 31 (AS) | 33 (AS) | 27 (AS) |

TABLE 3B

Boil-in-bag and chemical aging performance for the laminates prepared with Comparative Example 8 and Examples 9 to 11 on PET//PE structures. Quantities and units are the same as those in Table 3A.

|  | Comp. Example 8 | Example 9 | Example 10 | Example 11 |
|---|---|---|---|---|
| 4 hour dry bond | 402 (AS) | 484 (AS) | 503 (AS) | 423 (AS) |
| 1 day dry bond | 678 (AS) | 1075 (FT) | 904 (FT/FS) | 668 (AS) |
| 7 day dry bond | 765 (AS) | 1051 (FT) | 994 (FT) | 1075 (FT) |
| Boil-in-bag | 381 (AS) | 359 (AT) | 333 (AS) | 339 (AT) |
| Aging | 441 (AT/AS) | 682 (AT/AS) | 490 (AT/AS) | 522 (AT/AS) |

Adhesive Compositions Using MOR-FREE™ C-411 as a Multifunctional Isocyanate-Reactive Component (in Pack A).

Adhesive compositions using MOR-FREE™ C-411 as a multifunctional isocyanate-reactive component (in pack A) and using MOR-FREE™ L75-164 as a multifunctional isocyanate prepolymer (in pack B).

Adhesive compositions were applied at a coating weight of 1.74 g/m² (1.07 pound/ream).

Promoters were added to the MOR-FREE™ C-411 polyol at the concentrations as listed in Table 4. The promoters being tested were the epoxy phosphate ester of Pre-example 3(a) at two different loading levels. Also, the polyphosphoric acid (115 grade) (PP acid) was tested as the Comparative Example 15, and it was maintained at the same level of phosphorous element as Example 14 below. The blends were mixed using a Flacktek high speed mixer at a speed of 3000 rpm for 1 minute.

TABLE 4

Compositions of co-reactant blends in Comparative Example 12, Examples 13-14, and Comparative Example 15. The amounts shown are in grams. Promoter conc. is weight % based on the weight of the complete adhesive composition.

|  | C-411 | Pre-ex. 3(a) | PP acid | Promoter conc. |
|---|---|---|---|---|
| Comparative Example 12 | 50 | — | — | 0 |
| Example 13 | 50 | 0.35 | — | 0.20 |
| Example 14 | 50 | 0.91 | — | 0.51 |
| Comparative Example 15 | 50 | — | 0.11 | 0.06 |

40 parts (by weight) of the polyol blends were mixed with 100 parts (by weight) of the MOR-FREE™ L75-164 isocyanate prepolymer. The mixture was then applied on the Prelam film with a coating weight of 1.07 lbs/ream (1.74 g/m²), followed by laminating it with GF-19 film using Nordmeccanica LaboCombi laminator. Laminates were tested for the bond strength after 3 hours, one day, seven days, boil in bag and chemical aging. Results are listed in Table 5 as below.

It can be seen that the dry bond strength (1 day and 7 day) as well as the bond strength after the boil in bag could be improved significantly with the use of promoters. The Control Example 12 has very low bond strength after the boil-in-bag test, whereas the samples with epoxy phosphate ester of Pre-example 3(a) have exceptional bond strength and the value increased significantly with the phosphate concentration. In addition, the bond strength after the chemical aging test also improved significantly with the use of higher concentration of epoxy phosphate as shown in Example 14 vs. Example 13. On the other hand, the bond strength after the boil-in-bag and chemical aging test with the polyphosphoric acid (Comparative Example 15) is much less compared to values obtained in Example 14.

TABLE 5

Dry bond, boil-in-bag and chemical aging performance for the laminates prepared with formulations of Comparative Example 12, Examples 13-14, and Comparative Example 15 on the foil//PE structure. Dry bond was tested at time intervals after the formation of the sample. All values are in units of grams per 2.54 cm of sample width (g/in).

|  | Comparative Example 12 | Example 13 | Example 14 | Comparative Example 15 |
|---|---|---|---|---|
| 3 hour dry bond | 210 (AS) | 225 (AS) | 295 (AS) | 323 (AS) |
| 1 day dry bond | 557 (AT) | 1114 (AT/FS) | 1188 (AT/FS) | 762 (AT) |
| 7 day dry bond | 372 (AT) | 1091 (AT/FS) | 1143 (AT/FS) | 804 (AT) |
| Boil-in-bag | 75 (AT) | 536 (AT) | 784 (AT) | 485 (AT) |
| Aging | 31 (AS) | 38 (AS) | 106 (AS) | 44 (AS) |

Adhesive compositions using MOR-FREE™ C-411 as a multifunctional PGP isocyanate-reactive component (in pack A) and using MOR-FREE™ L75-164 as the multifunctional isocyanate prepolymer (in pack B). Adhesive compositions were applied at a coating weight of 2.22 g/m² (1.7 pound/ream).

Promoters were added to the MOR-FREE™ C-411 polyol at the concentrations as listed in Table 6. The promoters being tested were the epoxy phosphate ester of Pre-example 3(a) at two different loading levels. Also, the epoxy terminated-polyester of Pre-example 2, the ortho-phosphoric acid (85% aqueous solution) (OPA), and the phosphate ester of Pre-example 4 were evaluated as comparative examples. The Comparative Examples 19-21 were maintained at the same level of phosphorous element as Example 18 below. The blends were mixed using a Flacktek high speed mixer at a speed of 3000 rpm for 1 minute.

TABLE 6

Composition of co-reactant blends in Comparative Example 16, Examples 17-18, and Comparative Example 19-21. Amounts shown are in grams. Prom. conc. is weight percent of promoter based on the total weight of the adhesive composition.

|  | C-411 | Pre-ex. 3(a) | Pre-ex. 2 | OPA | Pre-ex. 4 | Prom. conc. |
|---|---|---|---|---|---|---|
| Comp. Ex. 16 | 50 | — | — | — | — | 0 |
| Example 17 | 50 | 0.35 | — | — | — | 0.20 |
| Example 18 | 50 | 0.91 | — | — | — | 0.51 |
| Comp. Ex. 19 | 50 | — | 0.80 | — | — | 0.45 |
| Comp. Ex. 20 | 50 | — | — | 0.09 | — | 0.05 |
| Comp. Ex. 21 | 50 | — | — | — | 4.40 | 2.31 |

40 parts (by weight) of the polyol blends were mixed with a 100 parts (by weight) of the MOR-FREE™ L75-164 isocyanate prepolymer. The mixture was then tested for pot life, with the results shown in Table 7. The mixture was also applied on the Prelam film with a coating weight of 1.7 lbs/ream (2.77 g/m²), followed by laminating it with GF-19 film using Nordmeccanica LaboCombi laminator. Laminates were tested for the bond strength after 3 hours, one day, seven days, boil in bag and chemical aging. Results are listed in Tables 8A and 8B below.

TABLE 7A

Viscosity versus time in minutes ("min."). Results shown are viscosity at 40° C. as measured as described above in the definition of the Pot Life testing. Units are mPa*s.

|  | 0 min | 10 min | 20 min | 30 min | 40 min | 60 min |
|---|---|---|---|---|---|---|
| Comparative Example 16 | 1638 | 1238 | 1713 | 2412 | 3238 | 5413 |
| Example 17 | 1663 | 1513 | 2475 | 3912 | 5850 | — |
| Example 18 | 1950 | 2025 | 3295 | 7163 | — | — |
| Comparative Example 19 | 1550 | 1275 | 1850 | 2625 | 3575 | 6000 |
| Comparative Example 20 | 1850 | 2000 | 4013 | 7463 | — | — |
| Comparative Example 21 | 1800 | 1913 | 2625 | 6450 | — | — |

TABLE 7B

Pot-life of adhesive compositions of Example 17-18 and Comparative Examples 16 and 19-21.

| Example | Pot Life (minutes) |
|---|---|
| Comparative Example 16 | 53 |
| Example 17 | 34 |
| Example 18 | 22 |
| Comparative Example 19 | 49 |
| Comparative Example 20 | 22 |
| Comparative Example 21 | 24 |

For this type of adhesive composition, using this polyol and this isocyanate prepolymer, Examples 17 and 18 show acceptable pot life.

As shown in Tables 8A and 8B, on both Prelam//GF-19 and Prelam A1//CPP structures, the dry bond strength (1 day and 7 day) as well as the bond strength after the boil-in-bag could be improved significantly with the use of all types of promoters (both examples of the present invention and comparative examples), except for the case of Comparative Example 19 where the epoxy-terminated polyester of Pre-example 2 was directly applied as an additive in the formulation. It can be seen that the epoxy-terminated polyester (which is different from the epoxy phosphate ester of the present invention) by itself alone is not an effective performance promoting additive.

The Control Example 16 has very low bond strength after the boil-in-bag test, whereas the samples with epoxy phosphate ester of Pre-example 3(a) have exceptional bond strength and the value increased significantly with the phosphate concentration as shown in Example 17 vs. Example 18. Although applied at the same level of phosphorous element, the ortho-phosphoric acid (Comparative Example 20) and Phosphate ester of Pre-example 4 (Comparative Example 21) did not boost the performance as efficiently as the epoxy phosphate ester of Pre-example 3(a). In addition, the bond strength after the chemical aging test also improved significantly with the use of higher concentration of epoxy phosphate ester as in Example 17 vs. Example 18. On the other hand, the bond strength after the chemical aging test with ortho-phosphoric acid (Comparative Example 20) and Phosphate ester of Pre-example 4 (Comparative Example 21) is much less compared to values obtained in Example 18.

On the Prelam A1//CPP structure, after the retort test, the laminates prepared with the Control Example 16 and with the one modified by the epoxy terminated polyester of Pre-example 2 (Comparative Example 19) completely delaminated. As a comparison, the laminates made with the epoxy phosphate ester of Pre-example 3(a), ortho-phosphoric acid and Phosphate ester of Pre-example 4 modified formulations can still retain a very decent bond strength, and the epoxy phosphate ester of Pre-example 3(a) gave the optimal results.

TABLE 8A

Dry bond, boil-in-bag, and chemical aging performance for the laminates prepared with formulations in Comparative Example 16, Examples 17-18, and Comparative Examples 19-21 Prelam A1//GF-19 structures. Results are reported in grams of force per 2.54 cm of width of sample (g/2.54 cm or g/inch), along with the failure mode.

|  | Com. Ex. 16 | Ex. 17 | Ex. 18 | Com. Ex. 19 | Com. Ex. 20 | Com. Ex. 21 |
|---|---|---|---|---|---|---|
| 4 hour | 214 (AS) | 310 (AS) | 389 (AS) | 244 (AS) | 207 (AS) | 216 (AS) |
| 1 day | 493 (AT) | 1561 (AT/FS) | 1462 (FT) | 456 (AT) | 718 (AT) | 740 (AT) |
| 7 day | 462 (AT) | 1117 (FT/AT) | 1177 (FT/AT) | 482 (AT) | 673 (AT) | 740 (AT) |
| Boil-in-bag | 127 (AT) | 672 (AT) | 924 (FS/AT) | 246 (AT) | 338 (AT) | 483 (AT) |
| Aging | 16 (DL) | 363 (AS) | 909 (FS/AS) | 18 (DL) | 340 (AS) | 254 (AS) |

TABLE 8B

Dry bond, boil-in-bag, chemical aging and retort performance for the laminates prepared with formulations in Comparative Example 16, Examples 17-18, and Comparative Examples 19-21 on A1//3 mil CPP structures. Results are reported in grams of force per 2.54 cm of width of sample (g/2.54 cm or g/inch), along with the failure mode.

|  | Com.Ex. 16 | Ex. 18 | Com.Ex. 19 | Com.Ex. 20 | Com.Ex. 21 |
|---|---|---|---|---|---|
| 4 hour | 41 (AS) | 82 (AS) | 41 (AS) | 51 (AS) | 43 (AS) |
| 1 day | 905 (AT) | 1311 (AT) | 915 (AT) | 1083 (AT) | 1175 (AT) |
| 7 day | 919 (AT) | 1362 (AT) | 971 (AT) | 1086 (AT) | 1175 (AT) |
| Boil-in-bag | 10 (DL) | 791 (AT) | 20 (DL) | 212 (AT) | 691 (AT) |
| Aging | 38 (AS) | 745 (AS) | 34 (AS) | 352 (AS) | 568 (AS) |
| Retort | DL | 1056 (AT/AS) | DL | 614 (AS/DL) | 934 (AT/AS) |

The invention claimed is:

1. An adhesive composition comprising:
  (A) one or more multi-functional isocyanate prepolymers comprising (i) one or more multifunctional isocyanate monomers, and (ii) phosphoric acid;
  (B) one or more multifunctional isocyanate-reactive compounds selected from the group consisting of polyether polyols, polyester polyols, and combinations thereof; and
  (C) one or more epoxy phosphate esters having structure (I)

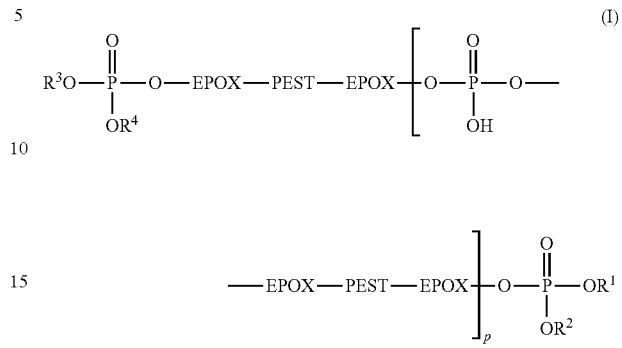

wherein each of $R^1$, $R^2$, $R^3$, and $R^4$ is independently hydrogen or an organic group, wherein p is 0 to 3, wherein each PEST has structure (II)

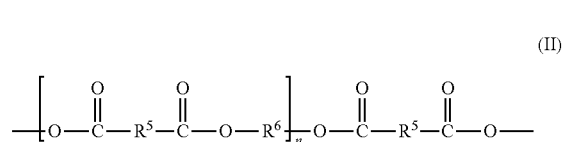

wherein each $R^5$ and each $R^6$ is an organic group, wherein n is 2 or greater, wherein each EPOX has structure (III)

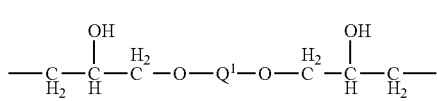 (III)

and wherein each $Q^1$ is an organic group.

2. The composition of claim 1 wherein each of $R^1$, $R^2$, $R^3$, and $R^4$ is hydrogen.

3. The composition of claim 1 wherein $Q^1$ is an aliphatic group.

4. A method of making the composition of claim 1, wherein the method comprises reacting one or more epoxy-terminated polyesters with one or more phosphoric acids.

5. The adhesive composition of claim 1 wherein structure (I) is present in an amount of 2% or less by weight based on the total weight of the adhesive composition.

6. The adhesive composition of claim 1, wherein the adhesive composition is in the form of two separate packs consisting of
   a) Pack A, which comprises all of the isocyanate-reactive compounds in the adhesive composition and all of the epoxy phosphate esters in the adhesive composition, and
   b) Pack B, which comprises all of the isocyanate compounds in the adhesive composition.

7. A method of making a laminate comprising
   A) applying a layer of the adhesive composition of claim 1 to a first face of a first film,
   B) bringing a first face of a second film into contact with the layer of the adhesive composition of claim 1,
   C) curing the layer of the adhesive composition of claim 1.

8. A laminate formed by the method of claim 7.

9. The adhesive composition of claim 1 wherein the (A) one or more multi-functional isocyanate prepolymers comprises (iii) castor oil.

10. An adhesive composition comprising:
   (A) a multi-functional isocyanate prepolymer comprising (i) one or more multifunctional isocyanate monomers, and (ii) castor oil;
   (B) one or more multifunctional isocyanate-reactive compounds selected from the group consisting of polyether polyols, polyester polyols, and combinations thereof;
   (C) an epoxy phosphate ester having structure (I)

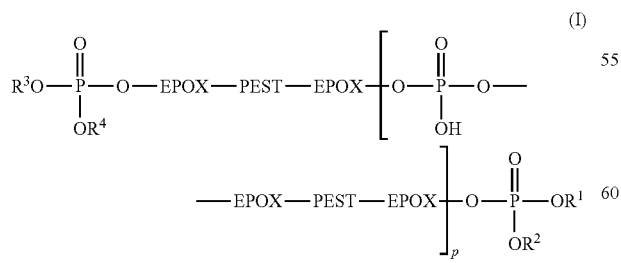 (I)

wherein each of $R^1$, $R^2$, $R^3$, and $R^4$ is independently hydrogen or an organic group, wherein p is 0 to 3, wherein each PEST has structure (II)

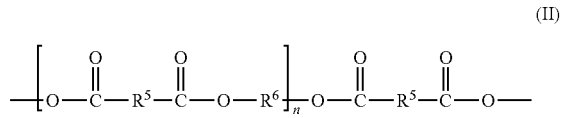 (II)

wherein each $R^5$ and each $R^6$ is an organic group, wherein n is 2 or greater, wherein each EPOX has structure (III)

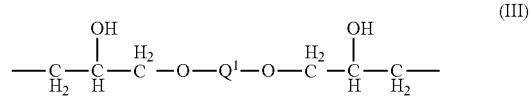 (III)

and wherein each $Q^1$ is an organic group.

11. An adhesive composition consisting of:
   (A) one or more multi-functional isocyanate prepolymers consisting of one or more isocyanate monomers, one or more polyols, one or more multi-acids, optional phosphoric acid, and optional castor oil;
   (B) one or more multifunctional isocyanate-reactive compounds selected from the group consisting of polyether polyols, polyester polyols, and combinations thereof; and
   (C) an epoxy phosphate ester having structure (I)

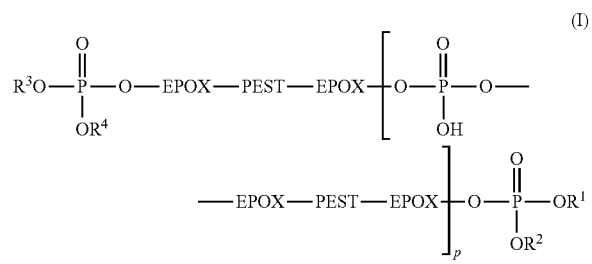 (I)

wherein each of $R^1$, $R^2$, $R^3$, and $R^4$ is independently hydrogen or an organic group, wherein p is 0 to 3, wherein each PEST has structure (II)

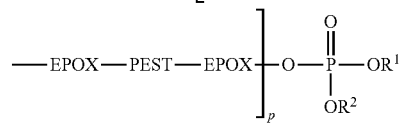 (II)

wherein each $R^5$ and each $R^6$ is an organic group, wherein n is 2 or greater, wherein each EPOX has structure (III)

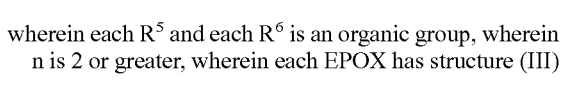 (III)

and wherein each $Q^1$ is an organic group.

12. The adhesive composition of claim 11 wherein phosphoric acid is present in the one or more multi-functional isocyanate prepolymers.

13. The adhesive composition of claim 12 wherein castor oil is present in the one or more multi-functional isocyanate prepolymers.

\* \* \* \* \*